United States Patent [19]

Callaway et al.

[11] Patent Number: 4,863,777
[45] Date of Patent: Sep. 5, 1989

[54] WALLCOVERING

[75] Inventors: Brian Callaway, Moore; Edgar H. Pittman, Spartanburg, both of S.C.

[73] Assignee: Milliken Research Corporation, Spartanburg, S.C.

[21] Appl. No.: 45,421

[22] Filed: May 4, 1987

[51] Int. Cl.⁴ .................. B32M 5/08; B32M 5/12; B32M 7/08; B32M 7/12
[52] U.S. Cl. .................... 428/103; 428/109; 428/110; 428/111; 428/196; 428/197; 428/200; 428/205; 428/236; 428/247; 428/254; 428/904.4
[58] Field of Search ............... 428/103, 196, 197, 200, 428/205, 236, 247, 254, 904.4, 109, 110, 111

[56] References Cited

U.S. PATENT DOCUMENTS

| | | |
|---|---|---|
| 3,031,349 | 4/1962 | Dritz . |
| 3,279,221 | 10/1966 | Glicksmann . |
| 3,486,956 | 12/1969 | Lee et al. . |
| 3,567,565 | 3/1971 | Jones et al. . |
| 3,649,427 | 3/1972 | Hughes . |
| 4,071,647 | 1/1978 | McMullen . |
| 4,277,527 | 7/1981 | Duhl . |
| 4,297,156 | 10/1981 | Dalle . |
| 4,330,580 | 5/1982 | Dalle .................... 428/229 |
| 4,426,414 | 1/1984 | Wilkerson . |
| 4,550,045 | 10/1985 | Hutson . |
| 4,608,290 | 8/1986 | Schnegg .................... 428/109 |
| 4,724,179 | 2/1988 | Schnegg .................... 428/109 |

Primary Examiner—James C. Cannon
Attorney, Agent, or Firm—Earle R. Marden; H. William Petry

[57] ABSTRACT

A wallcovering material having a paper backing being color and/or design printed face to which substantially parallel warp and fill yarns are tricot stitched thereto to provide an aesthetic structure through which the color and/or design shows through. The warp and weft yarns are knit to the paper backing material and held firmly in place by the polyethylene film on the face of the paper backing. The warp and weft yarns are openly spaced so that the color and/or design printed on the paper shows through and provides a pleasant view to the area in which the wallcovering is installed.

6 Claims, 1 Drawing Sheet

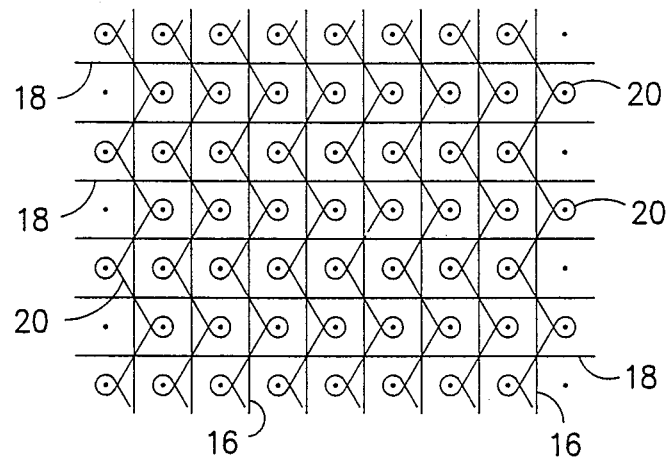
FIG. -1-
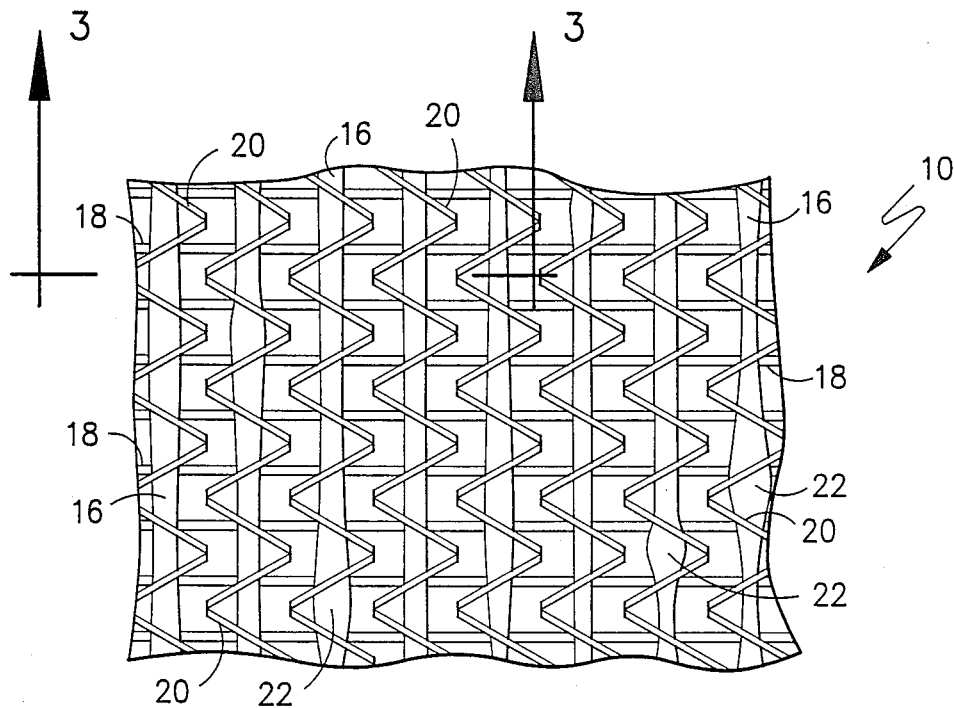
FIG. -2-
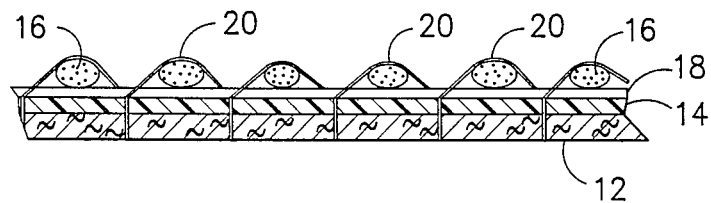
FIG. -3-

WALLCOVERING

This invention relates generally to wallcovering or panel covering fabrics and in particular to an inexpensive wallcovering which can be readily manufactured, easily installed and has a pleasant aesthetic effect upon installation.

An object of the invention is to provide a wall product in which the color or basic design thereof can be printed or otherwise applied on the backing thereof and can be readily seen through the supporting substrate.

Other objects and advantages of the invention will become readily apparent as the specification proceeds to describe the invention with reference to the accompanying drawing, in which:

FIG. 1 is a schematic representation of the stitch arrangement of the supporting textile product of the wallcovering;

FIG. 2 is a front view of the wallcovering as it is installed, and;

FIG. 3 is a cross-section view taken on line 3—3 of FIG. 2.

The wall covering product 10 basically consists of a paper backing material 12 coated with a layer of polyethylene film 14 and a textile product of the coated side thereof consisting of warp yarns 16, weft yarns 18 and stitching yarn 20. In use, the product 10 can be adhered to wallcovering panels of wood or other material or can be mounted by any suitable means directly to the surface to be covered.

The face of the paper backing material 12 is pre-color and/or design printed 60 pound weight blended stock and coated with a 2 or 2½mil thickness of packaging grade polyethylene to form the film 14. The paper backing material is printed with resin bonded pigment colors using a standard, commercially available engraved printing roll.

The wallcovering fabric 10 is produced, preferably, on a stitch-through machine such as a commercially available Malimo-type stitch-through machine. The polyethylene coated paper backing material 12 is fed through the machine with the film 14 facing upward. As the paper is being fed through the machine, 150/34 textured filament weft yarns 18 are delivered from packages on a side creel and laid randomly across the paper substantively parallel to one another and in a density to average one yarn per knitting course but can be in the range of ½ to 2 per course. At the same time a plurality of warp yarns 16 are delivered from warp beams and laid on top of the weft yarns in the machine direction substantially parallel to one another. In the preferred embodiment the average number of warp yarns per inch is seven (7). If desired the number of warp yarns can be between 3 and 14 per inch and still accomplish the see through effect. The warp yarn 16 is preferably a slub yarn having slubs 22 therein and are made on a spinning machine using a combination of catch cord waste, sliver and colored staple fibers.

After the warp and weft yarns are placed onto the polyethylene coated paper, the knitting needles of the stitch-bonding machine pierces the paper from the underside and using a tricot stitch 1-0, 1-2 secure the warp and weft yarns to the paper with a 150/34 textured filament polyester yarn 20 supplied from beams to the knitting needles.

The knitted composite structure is then delivered to a heat fusing machine to melt the polyethylene on the paper to heat bond the structure together. In practice a transfer print machine having a large heated metal cylinder and a blanket was used. The cylinder was operated at a temperature of 350° F. and the composite structure was fed threrethrough at a speed of three (3) meters per minute to provide a heat exposure of approximately 15 seconds. This heat bonding stabilizes the yarns on the paper, increases the abrasion resistance and toughness of the structure and minimizes the fraying of the final cut edge of the product.

The herein described wall product is readily manufactured, durable and can be readily installed on a wall, on or in panels to be placed in a viewing area or in other suitable areas where decorative fabrics are desired. The particular construction of the fabric and the spacing of the yarns therein provide a fabric which is not only durable but presents a pleasing aesthetic effect to the viewer depending on the design and/or colors on the paper seen through the openly spaced yarns on the face of the fabric.

Although the preferred embodiment of the invention has been described, it is contemplated that many changes may be made without departing from the scope or spirit of the invention and it is desired that the invention be limited only by the claims.

We claim:

1. A wallcovering product comprising: a web of paper material having a face side and a back side with a color or design on the face side thereof, a layer of thermoplastic material on the face side of paper material, a plurality of weft yarns substantially parallel to one another laying on said layer of thermoplastic material transverse of said web of paper material, a plurality of warp yarns substantially parallel to one another laying on said layer of thermoplastic material substantially perpendicular to said weft yarns and a plurality of stitching yarns through said web of paper material securing said warp and weft yarns, said layer of thermoplastic material fusing said warp and weft yarns to said paper material, said warp yarns being spaced from another and being in number in the range of 3 to 14 per inch and the number of weft yarns being an average of ½ to 2 per course of stitch yarns to allow a visual view of the color or design on said web of paper material.

2. The product of claim 1 wherein said weft yarns are under said warp yarns next adjacent to said layer of thermoplastic material.

3. The product of claim 2 wherein each of said plurality of stitching yarns is knit in a tricot stitch.

4. The product of claim 3 wherein said thermoplastic material is polyethylene.

5. The product of claim 4 wherein said number of warp yarns per inch is seven (7).

6. The product of claim 5 wherein the number of weft yarns averages 1 per course.

* * * * *